Oct. 13, 1959     G. V. BURKE     2,908,099
TRIGGERED FISH POLE HOLDER
Filed May 15, 1958
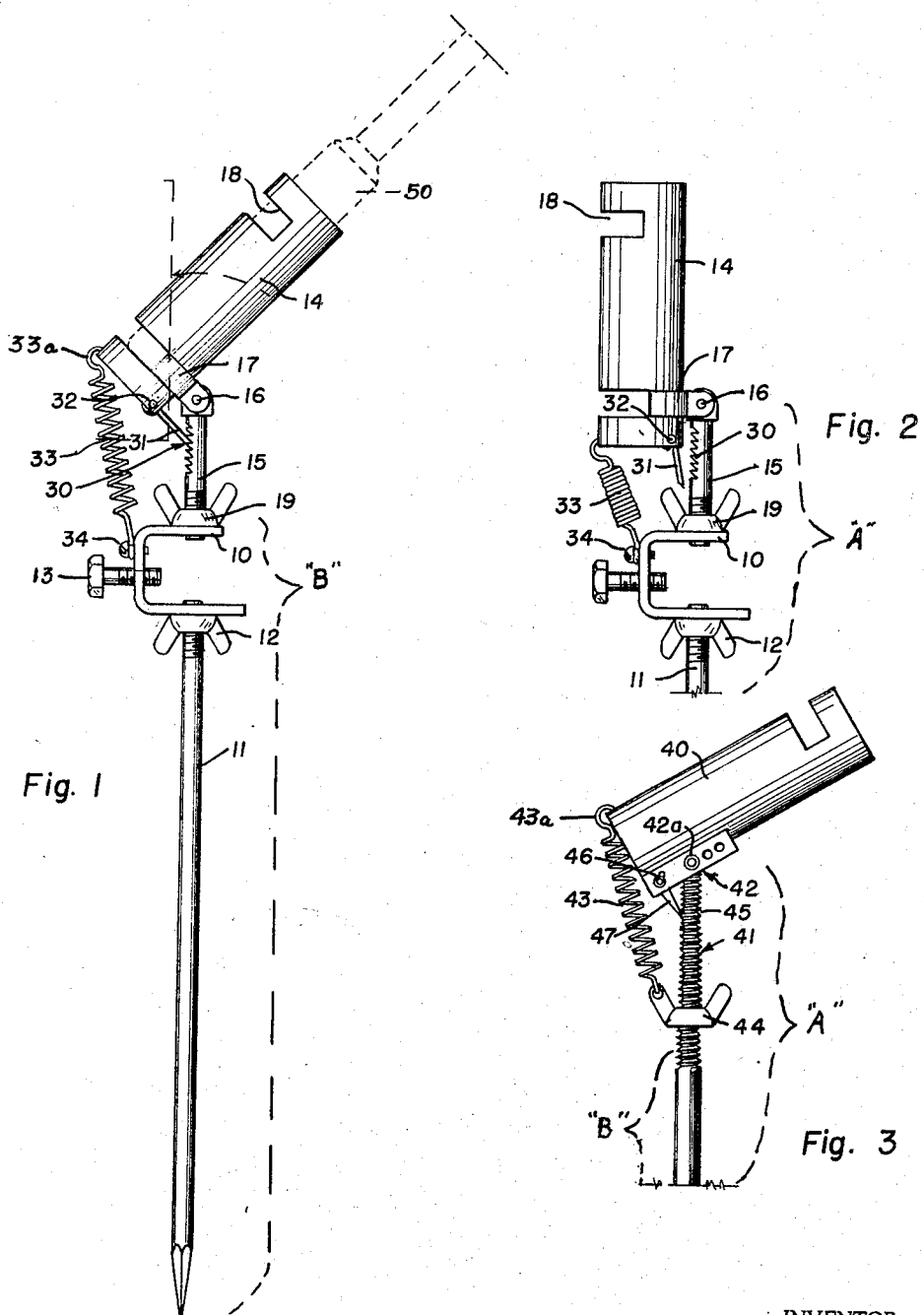
INVENTOR.
GUS V. BURKE
BY Wilbur A. E. Mitchell
ATTORNEY

United States Patent Office 2,908,099
Patented Oct. 13, 1959

2,908,099

TRIGGERED FISH POLE HOLDER

Gus V. Burke, Greeley, Colo., assignor to Gus' Tackle Co., Inc., Greeley, Colo., a corporation of Colorado Application May 15, 1958, Serial No. 735,485

5 Claims. (Cl. 43—16)

This invention relates to fish poles holders, wherein the handle of a fishing pole is placed therein, when the fisherman is fishing from a bank or a boat, so the fisherman may disregard the pole, and when a fish bites, the pull of the fish will automatically operate the trigger of the holder and the holder will automatically be operated with resultant set of the hook.

My invention has for its principal object the making of such a holder of fewer parts and with greater simplicity and resultant less cost of construction than ever, so far as known, used before.

More specifically, it is a primary object of my invention to provied a triggered fish pole holder, adapted to be secured to rib-side of a boat, by a screw-bracket means, and wherein the trigger setting is made by utilizing the threads of the screw-bracket means as the means for setting the trigger thereof.

Other and further objects will be apparent to those skilled in the art, from the following description and the drawings, in which drawings:

Figure 1 is a side elevational view of my novel holder;

Figure 2 is a partial side view thereof before trigger 31 is set in any one of the screw-thread abutment means 30; and Figure 3 is partial side view of a modification of my invention, with the trigger 47 thereof in set position.

I provide a U-shaped bracket 10, to be removably fixedly secured over the inside edge of the top gunwale rib of a boat, when desired to use my novel pole holder when fishing from a boat, and in such event the lower rod 11 is removed as will be explained. I provide a tubular section 14, adapted to receive the handle of a fishing pole therein, as will be explained, and I suitably pivotally mount 14 to and above the bracket 10, by partially downwardly cutting out a strip from and of 14, splitting it at its upper portion, and bending them downwardly, as at 17, to form a pair of suitable bearing members through which a pin 16 is suitably secured to comprise a pivot bearing. A stud bolt 15 has its head drilled to slidably have pin 16 extend through the drilled hole thereof, and with the head thereof loosely held by pin 16 between bearing tabs 17. Pin 16 is a conventional cotter key of split construction, so that one end thereof can have the portions of the split key extend beyond a tab 17 and then they are separated to thereby hold the pin in place. The lower end of the bolt 15 is screw threaded and is first screw threaded into a suitable internally threaded opening, provided for the purpose in the top portion of the bracket 10, before assembly of 14 onto the upper end of 15 just explained. A lock screw-wing-nut 19 is provided on those threads of 15 for securing 15 rigidly to 10 in conventional manner. At this point, it is to be noted, that the vertical cross-sectional thickness of the upper gunwale rib of various boats varies, and that I provide the construction just explained, of pivoting the holder 14 to a screw bolt 15, with the latter screw threaded into the upper arm of bracket 10, for utilizing stud screw bolt 15 also as a means for locking the bracket 10 to that gunwale rib in different sized ribs. I provide an outer screw stud bolt 13, in the vertical portion of bracket 10, for reason to be explained. A suitable coil tension spring 33 is provided, with one end thereof securely fastened by suitable means to the outer upper portion of the bracket 10, as at 34, and the other end thereof removably secured to the upper end of 14, as illustrated, as by providing a small opening at that end of 14 and inserting a spiral end loop 33a of 33 therethrough, for reason to be explained. A short rigid trigger bar 31 is suitably pivotally secured to the lower portion of the end of 14 having the spring, as illustrated, as by having the upper end of 31 bent into a loop and loosely extending over a pin 32 provided for the purpose in that end of 14, for reason to be explained. 14 is partially slotted adjacent and under the center of the pin 32 and of a size slot to permit 31 to freely swing on 32 within that slot. Spaced apart parallel horizontal notches 30 are provided on the surface of bolt 15, adjacent the trigger 31, being the same as the threaded periphery of 15, for reason to be explained. I provide a ground spike 11, screw threaded upwardly into an opening provided for the purpose, in the lower horizontal portion of the bracket 10, with a lock wing-nut 12 provided on the upper threaded portion, as illustrated, for reason to be explained.

In the operation of my novel pole holder, when used in a boat, the fisherman first unscrews lock wing-nut 12 and then unscrews ground spike 11 completely from the bracket 10, as it is not needed for boat use. Then wing-nut 19 is slightly unscrewed, and the upper removable end of spring 33 is removed by taking loop 33a out of its hole in 14, and then the fisherman places the bracket 10 on and partially around the top gunwale rib of the boat, with the open part of the bracket toward the outside of the boat, and then he turns the tube holder 14 and with it the bolt 15, by the threads of 15, clockwise, a revolution or more, until the lower end of 15 rests on top of that gunwale rib and with 14 positioned substantially broadside of the boat and with its spring end inwardly of the boat, and then he screws 13 inwardly on its threads until it seats against the inner edge of said gunwale rib, which thus firmly secures the bracket to the boat rib, and then the spring loop end 33a is replaced in its hole in 14, and lock nut 19 is then seated clockwise, and my novel pole holder will then be ready for use. The fisherman then places the handle of his fish pole, after making his cast or otherwise placing his line out for fishing, by inserting the handle, down into the tube 14 so that the handle freely rests therein and down against the spring as a stop, and then he sets the trigger 31. He sets the trigger by swinging 14 clockwise on its pivot 16 against the tension of 33, by holding the holder tube 14 with his hand until he places the lower end of 31 in one of the notches 30 and then he slowly releases his hold of 14, and in so doing the tension of 33 acts to bind the lower end of 31 against said notch, thus holding the holder unit as shown in Figure 1 in what is termed cocked position. It will thus be seen that when a fish strikes the bait of the hook on the line of the pole, having its handle in 14, that the resultant pull of the fish will transmit a pull through the line to the pole and slightly down on the pole against the spring 33 tension enough to release trigger 31 from its notch 30, and then the spring 33 will cause 14 to pivot into the position shown in Figure 2, thus setting the hook into the fish by that spring movement yanking the pole upwardly, with resultant yanking of the line. It takes a very slight pull of the line to transmit enough pull through the pole to cause the result just explained. When fishing from the bank of a lake or stream, the ground spike 11 is replaced and it is placed into the bank when desired to use my novel pole holder for such fishing, the trigger setting and trigger action being the same as just explained.

It is to be noted in my modification of my invention shown in Figure 3, that I have provided adjustability of the tube section on its pivot to provide for the weight of the pole, so as to have needed proper balance, and that I clearly illustrate how I utilize the outer screw threads of the pivot bolt as the notches for use in setting the trigger, as will be explained. I provide in this modification a simplification of my bolt bracket means, indicated as "A," being an upper threaded ground spike 45, having the handle holding tubular means 40 pivoted to the upper end thereof at 42, and the tension means 43 having one or upper end thereof removably secured to 40 by its loop 43a being inserted in a hole provided in the end of 40, as illustrated, and with the lower or other end of 43 suitably secured to an ear of the spring-tension-adjusting wing-nut 44, as illustrated. 44 is first screw threaded onto the upper screw end 41 of bolt bracket means 45 before the tubular means 40 is pivotally mounted thereon. I provide the spring end of the tube 40 with a pair of downwardly extending leaves, as by suitably splitting the tube at that end, and extending them outwardly slightly in parallel arrangement, so as to provide bearings tabs, in which tabs I provide a plurality of aligned holes adapted to receive the bearing pin 42a. 45 is suitably flattened at its upper end and provided with a cross hole to receive the bearing pin 42a therethrough, and the construction is designed so as to permit 40 to be pivoted freely on 42a. The bar trigger means 47 is suitably pivoted at 46, between the tabs of 40, but otherwise similarly as in prior modification, so as to be free to swing on its pivot 46. Bearing pins 42a and 46, respectively are any suitable pins, such as cotter keys. The portion indicated as "B" I call holding means integrally a part of the bracket means "A," and is adapted for operatively securing my holder ready for use, being, in this modification illustrated, to the ground, by insert of the ground spike thereinto. In the prior modification, the similar holding means integral with the entire bracket means "A," for securing it in said modification either to a boat or the ground, is indicated as the portion "B" thereof. "A" is the entire bracket means on which the holder is pivoted; and "B" is the part of "A" which accomplishes the holding of "A." This modification shows how in my novel holder the trigger is set on a thread 41.

Having thus explained my invention in detail, it is to be understood that many changes may be made therein, and therefore I wish to be bound only by the hereunto appended claims.

What I claim and desire to secure by Letters Patent is:

1. A triggered fish pole holder, comprising, in combination, a bracket means adapted to be removably secured to the gunwale rib of a boat and having vertical screw-bolt means having external screw threads for securing a bracket thereto, a fish pole handle tubular holding means pivotally mounted onto the screw-bolt means, means for so pivotally mounting the tubular means to the screw-bolt means, coil tension means having one end thereof secured to the bracket means and the other end thereof secured to an end of the tubular means and with one of its ends being removably so secured, means for so securing one end of the tension means, means for so securing the other end of the tension means, said tension means being adapted for normally causing the tubular means to pivot on the screw-bolt means in one direction and into substantially a vertical plane, a stub-bar trigger prop means pivotally secured to and carried by the spring end of the tubular means and being adapted for trigger setting of the lower end thereof against any one external peripheral thread of the screw-bolt means for affecting a prop holding of the tubular means in a pivotal position thereof against the tension of the tension means, and means formed on the tubular means for so pivotally securing the bar trigger means to the tubular means.

2. A triggered fish pole holder as defined in the preceding claim, and characterized further by the definition of the trigger means being pivotally operable of its own weight in a plane to and away from the screw bolt means, after having been prop-set against one of said threads, and upon downward pull of the tubular means.

3. A pivotally operable tubular fish pole holder means having an upper and a lower side and bearing tab means on its lower side, a screw-bolt bracket means having external peripheral threads and two ends and a bearing opening through one of its ends and adapted at said one end to pivotally freely support the pole holder means thereon, bearing pin means carried by said tab means and freely extending through said opening of the bolt bracket means and adapted for freely pivotally mounting the pole holder means to said end of the bolt bracket means, means on the other end of the bracket means and adapted for securing the bolt bracket means in upright position for operative use of the pole holder means, tension means having two ends and having one end thereof secured to the bracket means and the other end thereof removably secured to an end of the tubular pole holder means and being adapted for normally causing the pole holder means to be pivotally moved in one direction on its pivot with the other end of the pole holder means elevated above the end to which the tension means is attached, means for securing one end of the tension means to the bracket means, means for so removably securing the other end of the tension means to an end of the pole holder means, a rigid stub trigger-bar means having two ends and with one of its ends pivotally secured to the tension means end of the pole holder means and with the other of its ends being adapted to be removably held in propped relationship against any one of the grooves between any two of the peripheral threads of the bolt bracket means by the tension of the tension means exerted through that end of the pole holder means and upon a pivoting of the pole holder means and manual pivot-setting movement of the trigger bar on the latter's pivot and positioning of the other end of the trigger bar against any one of the said grooves for thereby pivotally trigger bar prop-holding the pole holder means, and means for so pivotally securing the one end of the trigger bar to said end of the pole holder means.

4. A fish pole holder combination as defined in preceding claim 3, and defined further by the means for securing the one end of the tension means to the bracket means including a screw-nut-like means operably threadable on the exterior threads of the bolt bracket means for varying the tension of the tension means upon removing the other end of the tension means from its end of the pole holder means and changing the distance of the nut-like-means from the pivot of the pole holder means by turning the screw-nut-like means on the bolt bracket means and then replacing the other end of the tension means to its end of the pole holder means.

5. In a fish pole holder, the combination with a bracket means adapted to be removably and vertically secured either to the gunwale rib of a boat or to be positioned into the bank of a lake or stream and having a screw-bolt means having external peripheral screw-threads and the bolt means being screw operably extending vertically from and with relation to the bracket means at one of its ends, a tubular pole holder means pivotally mounted onto the other end of the screw-bolt means, means for so pivotally mounting the pole holder means to said other end of the screw-bolt means, coil tension means having one end thereof secured to the bracket means and the other end thereof secured to an end of the pole holder means and with one of said ends being removably so secured, means for so removably securing one end of the tension means, and means for so securing the other end of the tension means, said tension means being normally adapted for causing a vertical pivoting of the pole holder means on the upper end of the screw-bolt means in one direction and an elevating of the end of the pole holder means opposite the tension means end thereof and above the latter end thereof, of a rigid stub-bar trigger means having one end thereof pivotally secured to and carried by the spring end of the pole holder means and being adapted for removable trigger setting manually of the other and lower end thereof by a pendulum-like arc raising of said end against any one of the external peripheral threads of the screw bolt means for effecting a prop holding of the pole holder means on its pivot upon such a setting thereby and with the tension means expanded and against the tension of the tension means, and means for so pivotally securing the one end of the trigger bar means to and so as to be carried by the spring end of the pole holder means, said trigger bar means being further adapted to fall on its pivot of its inherent weight out of such thread engagement setting upon pivotal movement of the pole holder means a certain distance against the tension of the tension means.

References Cited in the file of this patent

UNITED STATES PATENTS

| | | |
|---|---|---|
| 1,856,477 | Gerline | May 3, 1932 |
| 1,859,944 | Waitt | May 24, 1932 |
| 2,551,996 | Cherubini | May 8, 1951 |
| 2,642,690 | Soenksen | June 23, 1953 |
| 2,693,660 | Nebergall et al. | Nov. 9, 1954 |
| 2,740,219 | Harden | Apr. 3, 1956 |
| 2,781,600 | McDonnell | Feb. 19, 1957 |
| 2,803,911 | Hollingsworth | Aug. 27, 1957 |
| 2,821,041 | Hughes | Jan. 28, 1958 |